May 19, 1936.  H. GOLDEN  2,041,332
FLASHLIGHT HOLDING DEVICE
Filed Nov. 23, 1934
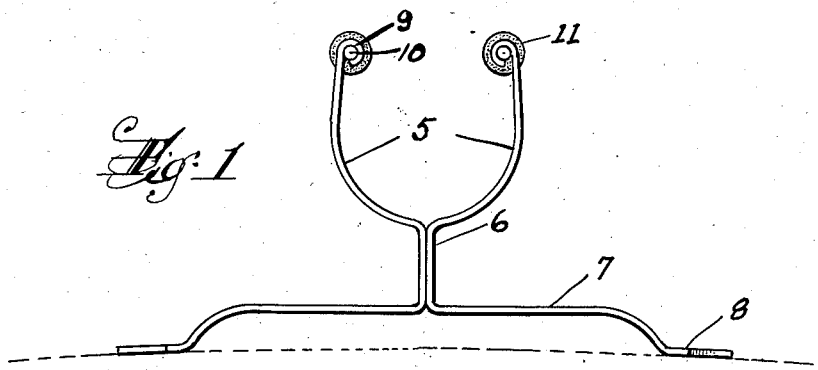
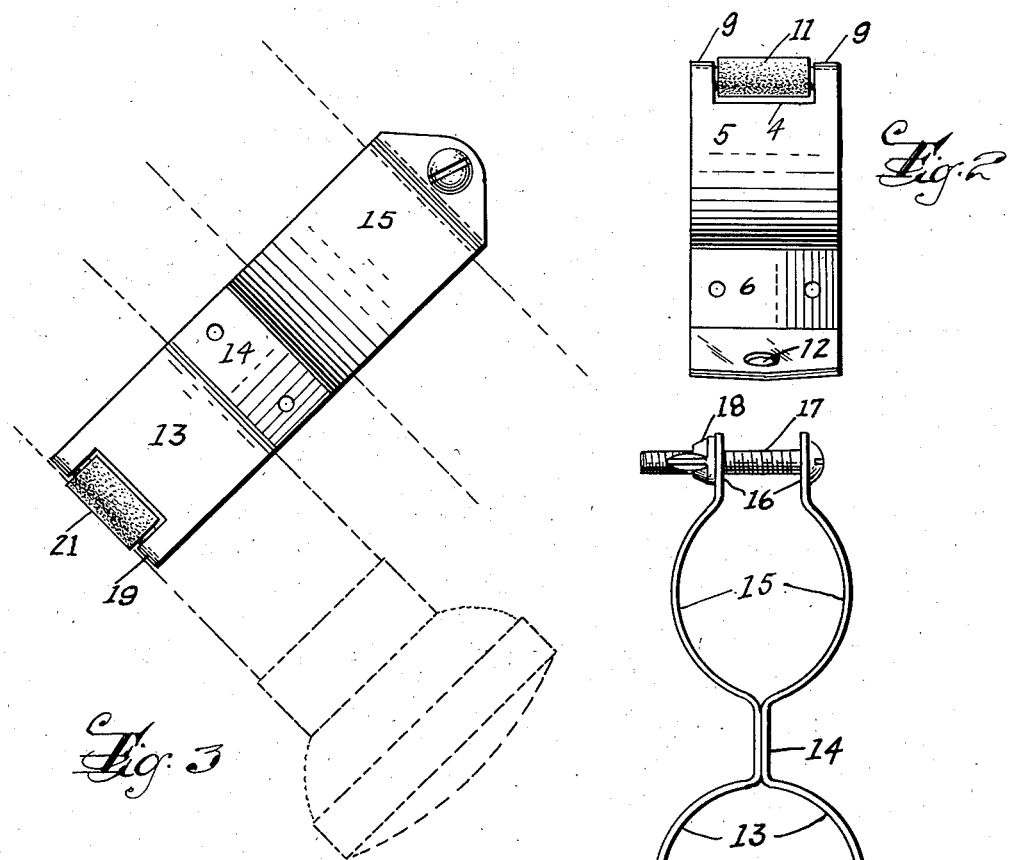
INVENTOR
HARRY GOLDEN
BY
his ATTORNEY Patented May 19, 1936

2,041,332

UNITED STATES PATENT OFFICE 2,041,332

FLASHLIGHT HOLDING DEVICE

Harry Golden, New York, N. Y., assignor to Magna Products Corp., New York, N. Y.

Application November 23, 1934, Serial No. 754,487

2 Claims. (Cl. 248—229)

This invention relates to improvements in devices for holding flashlights and similar articles of tubular shape; and has for an object the provision of means for releasably holding a flashlight or similar article, so that the flashlight can be readily and conveniently removed when desired.

Heretofore, flashlight holders have been provided with screw clamps which more or less permanently held the flashlight, and when it was desired to remove the flashlight, considerable manipulation was necessary, especially where the screw threads have become rusted or corroded. Also, such flashlight holders were adapted for attachment only in specific places.

A further object of the invention is the provision of a flashlight holding device which can be conveniently attached to a bicycle post so that the flashlight can serve as a headlight.

These and other objects are attained by the novel construction, combination and arrangement of parts hereinafter described and shown in the accompanying drawing, constituting a material part of this disclosure, and in which:

Fig. 1 is an elevational view of my device.

Fig. 2 is a side elevational view of the device.

Fig. 3 is a side view of a modified form of the invention showing the manner in which it may be attached to a bicycle and hold a flashlight.

Fig. 4 is a plan view of the form shown in Fig. 3.

Referring to the drawing, in Fig. 1, the device is shown to comprise a pair of bowed arms 5 made from flat spring metal as shown in Fig. 2. The bowed arms 5 have abutting straight portions 6, which are provided with right angularly directed arms 7, having downturned portions 8, provided with apertures 12 to receive a bolt or screw to enable the device to be conveniently attached to a relatively flat surface.

The extremities of the arms 5 have cut-out portions 4, and the metal adjacent the cut-out portions 4 at the sides of the arms is curled at 9 to support pins 10 which revolvably support rollers 11, which are preferably made of wood, or a similar material, the major portions of the rollers being positioned in the cut-out portions 4.

It will be seen that a flashlight or similar tubular article can be readily passed between the rollers 11 and held tightly in position by the bowed arms 5; and when so desired, the flashlight can be easily removed without necessitating the manipulating of threaded bolts and nuts and the like as heretofore has been the case.

In the form shown in Figs. 3 and 4, the device is adapted for attachment to a bicycle, and comprises a pair of bowed arms 13, having straight portions 14, connected to bowed arms 15, the latter being adapted to be clamped about a post of a bicycle; and for this purpose the arms 15 are provided with flat portions 16 having apertures through which pass a threaded bolt 17 carrying a wing nut 18.

The free ends of the arms 13 are curled at 19 to hold pins 20 which revolvably support rollers 21, made of wood or similar material.

With the structure shown in Figs. 3 and 4, a headlight for a bicycle can be provided at a low cost, it being only necessary to attach my device to the post of the bicycle and snap a flashlight into place; and when it is desired to use the flashlight for other purposes, it can be readily and conveniently removed.

The foregoing disclosure is to be regarded as descriptive and illustrative only, and not as restrictive or limitative of the invention, of which obviously an embodiment may be constructed including modifications without departing from the general scope herein indicated and denoted in the appended claims:

Having thus described my invention, what I claim as new and desire to secure by Letters Patent, is

1. A device for holding flashlights and the like, comprising a pair of bowed arms formed from sheet metal, said arms being attached to each other at one end thereof and having their free ends provided with cut-out portions, the parts of the arms adjacent the cut-out portions being curled, pins supported by said curled parts, rollers revolvably mounted on said pins, and means to attach said arms to a support.

2. A device for holding flashlights and the like, comprising a pair of bowed arms formed from sheet metal, said arms being attached to each other at one end thereof and having their free ends provided with cut-out portions, the parts of the arms adjacent the cut-out portions being curled, pins supported by said curled parts, rollers revolvably mounted on said pins, and means integral with said arms to clamp the device about a tubular support.

HARRY GOLDEN.